(12) United States Patent
Munch

(10) Patent No.: US 6,501,371 B2
(45) Date of Patent: Dec. 31, 2002

(54) APPARATUS AND METHOD FOR POSITIONING A REFLECTIVE SURFACE ON A VEHICLE

(75) Inventor: Carl A. Munch, Troy, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/862,373

(22) Filed: May 22, 2001

(65) Prior Publication Data
US 2002/0175810 A1 Nov. 28, 2002

(51) Int. Cl.[7] ................................................. B60Q 1/00
(52) U.S. Cl. .................... 340/436; 340/435; 340/903
(58) Field of Search ................................ 340/435, 436, 340/903, 904; 307/10.1; 180/167, 169, 271; 359/839, 843

(56) References Cited

U.S. PATENT DOCUMENTS

| | | | |
|---|---|---|---|
| 4,811,226 A | 3/1989 | Shinohara | 701/49 |
| 4,882,565 A | 11/1989 | Gallmeyer | 340/461 |
| 5,126,885 A | 6/1992 | Gray | 359/841 |
| 5,235,316 A * | 8/1993 | Qualizza | 340/436 |
| 5,313,335 A | 5/1994 | Gray et al. | 340/903 |
| 5,530,240 A | 6/1996 | Larson et al. | 250/214 AL |
| 5,668,675 A | 9/1997 | Fredricks | 359/843 |
| 5,694,259 A | 12/1997 | Brandin | 359/843 |
| 5,706,144 A | 1/1998 | Brandin | 359/843 |
| 5,798,575 A | 8/1998 | O'Farrell et al. | 307/10.1 |
| 5,801,823 A | 9/1998 | Brandin | 356/139.03 |
| 5,829,782 A | 11/1998 | Breed et al. | 280/735 |
| 5,886,838 A | 3/1999 | Kuramoto | 359/841 |
| 5,901,978 A | 5/1999 | Breed et al. | 280/735 |
| 5,959,367 A | 9/1999 | O'Farrell et al. | 307/10.1 |
| 5,993,015 A | 11/1999 | Fredricks | 359/843 |
| 6,116,742 A * | 9/2000 | Ahn | 359/843 |
| 6,193,380 B1 * | 2/2001 | Jacobs | 340/903 |

* cited by examiner

Primary Examiner—Van Trieu
(74) Attorney, Agent, or Firm—Tarolli, Sundheim, Covell, Tummino & Szabo L.L.P.

(57) ABSTRACT

A reflective surface positioning apparatus (10) includes first locating device (21), second locating device (22), first utilizing device (51), and second utilizing device (52). The first locating device (21) locates part (32) of an occupant (30) of a vehicle (6) and produces a first location signal (41) indicative of the location of the part (32) of the vehicle occupant (30). The second locating device (22) locates an object (71) external to the vehicle (6) and produces a second location signal (42) indicative of the location of the external object (71). The first utilizing device (51) utilizes the first location signal (41) to cause positioning of a first reflective surface (61) to a first default position. The second utilizing device (52) utilizes the second location signal (42) to reposition the first reflective surface (61) to a first temporary position for providing a view of the external object (71) to the part (32) of the vehicle occupant (30) for a predetermined time interval. Then, the second utilizing device (52) returns the first reflective surface (61) to the first default position.

20 Claims, 5 Drawing Sheets

APPARATUS AND METHOD FOR POSITIONING A REFLECTIVE SURFACE ON A VEHICLE

FIELD OF THE INVENTION

The present invention relates to an apparatus and method for positioning a reflective surface, such as a rearward-viewing mirror, on a vehicle and, more particularly, positioning the reflective surface relative to a part, such as an eye, of an occupant of the vehicle.

BACKGROUND OF THE INVENTION

A conventional apparatus positions a rear view mirror at a standard operating position depending on the location of a driver's eyes. However, the standard operating position has a blind spot that cannot be seen via the mirror by the driver. Another conventional apparatus includes a manual switch for moving a mirror so that a driver may view a blind spot.

SUMMARY OF THE INVENTION

In accordance with one aspect, the present invention provides a reflective surface positioning apparatus that includes first locating means, second locating means, first utilizing means, and second utilizing means. The first locating means locates part of an occupant of a vehicle and produces a first location signal indicative of the location of the part of the vehicle occupant. The second locating means locates an object external to the vehicle and produces a second location signal indicative of the location of the external object. The first utilizing means utilizes the first location signal to cause positioning of a first reflective surface to a first default position. The second utilizing means utilizes the second location signal to reposition the first reflective surface to a first temporary position for providing a view of the external object to the part of the vehicle occupant for a predetermined time interval. Then, the second utilizing means returns the first reflective surface to the default position.

In accordance with another aspect, the present invention provides a method for positioning at least one reflective surface on a vehicle. A part of an occupant of the vehicle is located. A first location signal indicative of the location of the part of the vehicle occupant is produced. An object external to the vehicle is located. A second location signal indicative of the location of the external object is produced. The first location signal is utilized to cause positioning of a first reflective surface to a first default position. The second location signal is utilized to reposition the first reflective surface to a first temporary position for providing a view of the external object to the part of the vehicle occupant for a predetermined time interval. The first reflective surface is returned to the default position.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
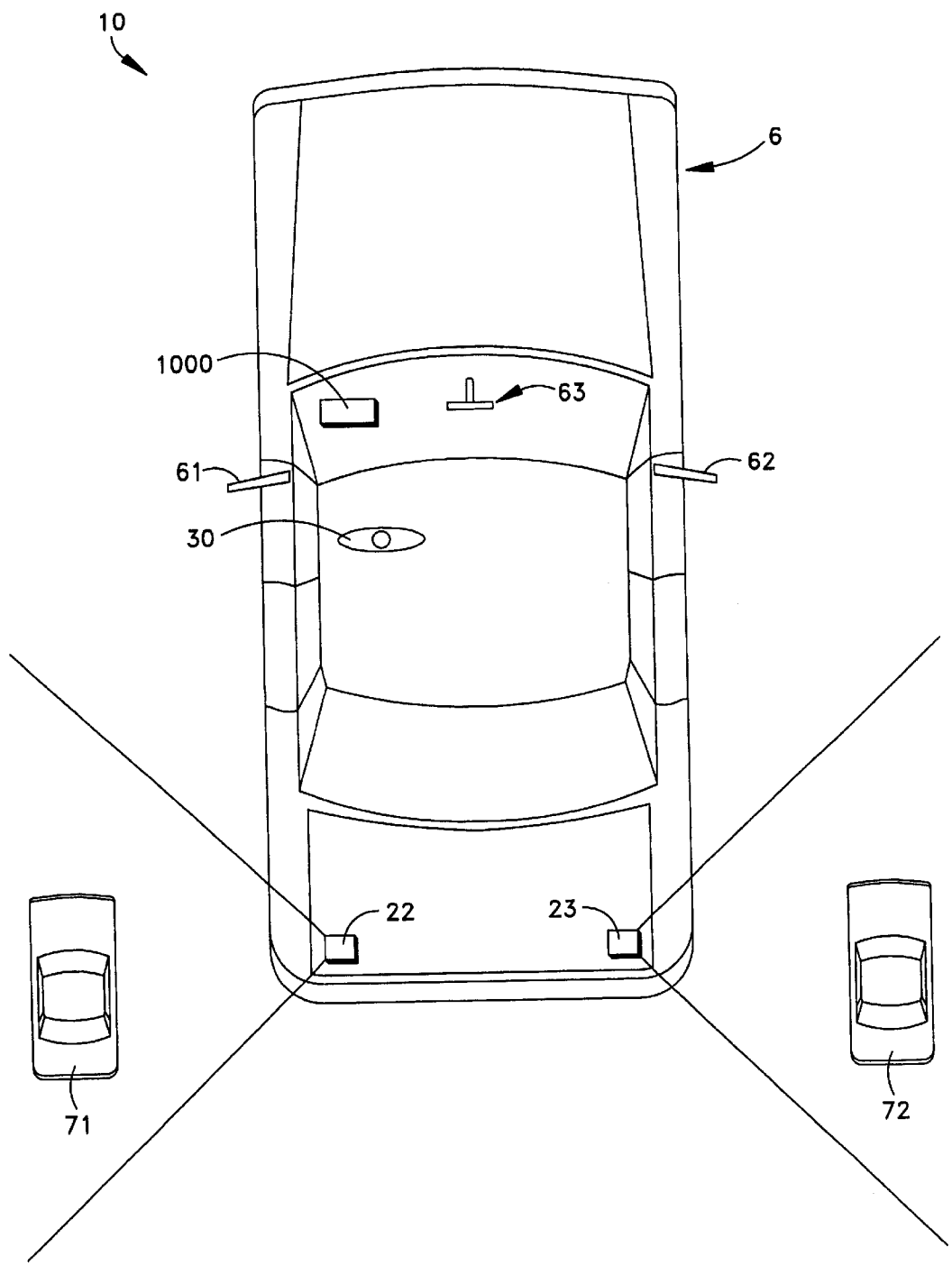
FIG. 1 is a schematic view of a vehicle having the reflective surface positioning apparatus in accordance with the present invention.

In accordance with the present invention, an apparatus 10 (FIG. 1) and method for helping to protect an occupant, such as the driver, 30 of a vehicle 6 positions one or more reflective surfaces (e.g., driver's side view mirror 61) on the vehicle relative to a part (e.g., eyes 32, see FIG. 2) of the occupant of the vehicle.

Figure 5:
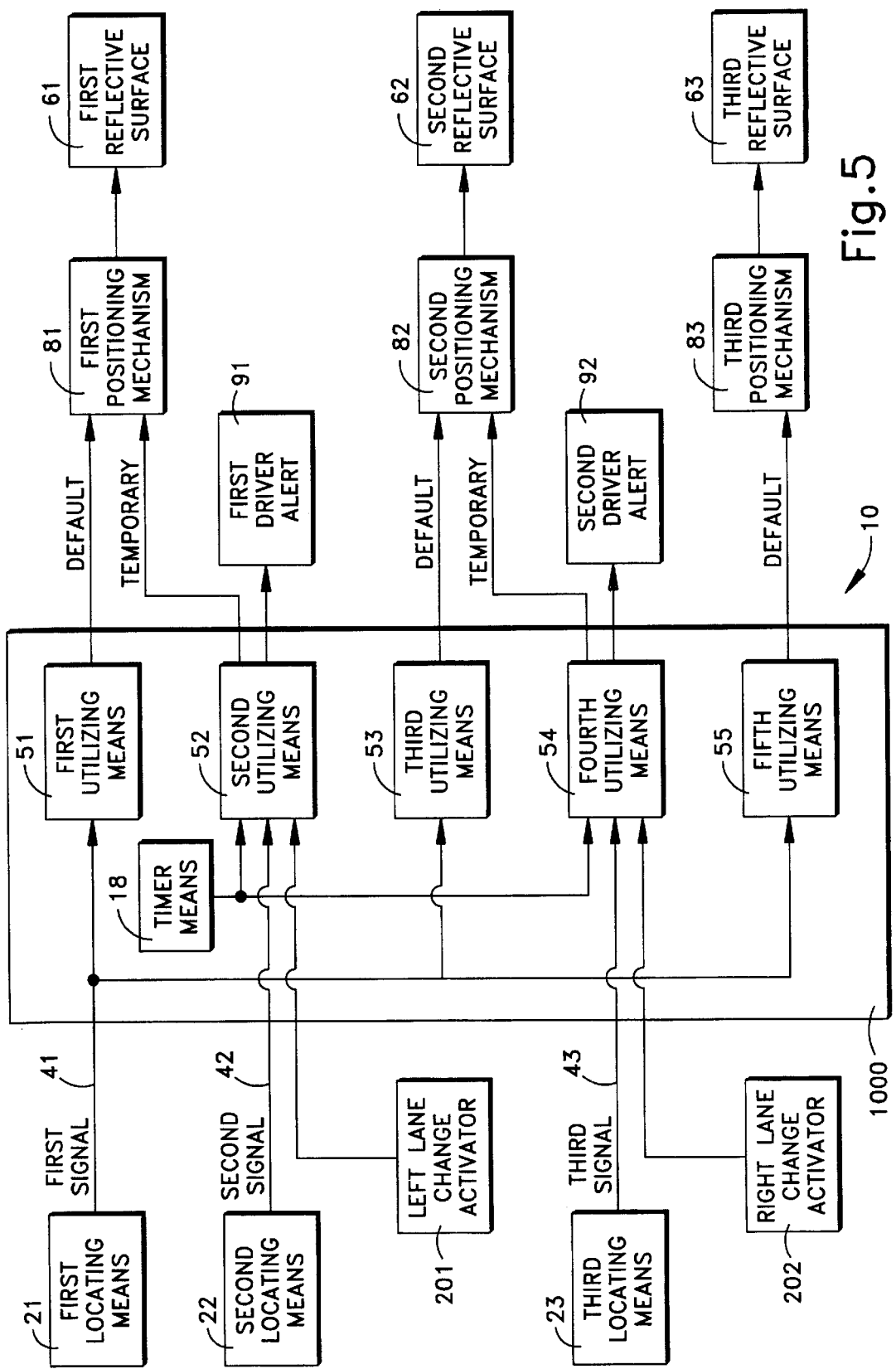
FIG. 5 is a schematic block diagram illustrating the apparatus and method of the present invention.

As shown in FIG. 5, the reflective surface positioning apparatus 10 includes first means 21, such as internal vehicle sensors, for locating the part (e.g., the eyes 32) of the driver 30 and for producing a first location signal 41 indicative of the location of the part (eyes) of the driver. The apparatus 10 further includes second means 22, such as external vehicle sensors, for locating an object 71 external to the vehicle 6 and producing a second location signal 42 indicative of the location of the external object. The second locating means 22 may be disposed at one of the rear corners of the vehicle 6 (FIG. 1) and may include a conventional external vehicle sensor with an ultrasonic transducer for sensing the presence of objects in a specific area, such as a blind spot of a first reflective surface 61 (driver's side view mirror). The external sensor may alternatively be a virtual or visual sensor.

The apparatus 10 may further include a microcontroller 1000 (FIG. 2) having a first utilizing means 51, a second utilizing means 52, a third utilizing means 53, a fourth utilizing means 54, and a fifth utilizing means 55. The first utilizing means 51 uses the first location signal 41 to position the first reflective surface 61 to a first default position when the driver 30 begins operation of the vehicle 6. The second utilizing means 52 uses the second location signal 42 to reposition the first reflective surface 61 to a first temporary position. The temporary position provides a view of the external object 71 to the eyes 32 of the driver 30 for a predetermined time interval. The second utilizing means 52 then returns the first reflective surface 61 to the first default position.

The second utilizing means 52 also uses the second location signal 42 to alert the driver 30 that an object 71 is located in the blind spot of the first reflective surface 61. The driver 30 is alerted by a first driver alert 91, such as a visual warning light located adjacent the first reflective surface 61 or in the dashboard of the vehicle 6.

A third locating means 23 locates a second object 72 external to the vehicle 6 and produces a third location signal 43 indicative of the location of the second external object. The third locating means 23 may be disposed at one of the rear corners of the vehicle 6 (FIG. 1) and may include a conventional external vehicle sensor with an ultrasonic transducer for sensing the presence of objects in a specific area, such as a blind spot of a second reflective surface 62. The external sensor may alternatively be a virtual or visual sensor. The third utilizing means 53 uses the first location signal 41 to position the second reflective surface 62, such as a passenger side view mirror, to a second default position when the driver 30 begins operation of the vehicle 6.

The fourth utilizing means 54 uses the third location signal 43 to reposition the second reflective surface 62 to a second temporary position. The second temporary position provides a view of the second external object 72 to the eyes 32 of the driver 30 for a predetermined time interval. The fourth utilizing means 54 then returns the second reflective surface 62 to the second default position.

The fourth utilizing means 54 also uses the third location signal 43 to alert the driver 30 that the second external object 72 is located in the blind spot of the second reflective surface 62. The driver 30 is alerted by a second driver alert 92, such as a visual warning light located adjacent the second reflective surface 62 or in the dashboard of the vehicle 6.

The fifth utilizing means 55 uses the first location signal 41 to position a third reflective surface 63, such as a windshield mounted rear view mirror, to a third default position when the driver 30 begins operation of the vehicle 6, similar to the first and second utilizing means 51, 53.

The first locating means 21 may include a first ultrasonic transducer 101, a second ultrasonic transducer 102, and a third ultrasonic transducer 103 disposed in the passenger compartment 9 of the vehicle 6. Alternatively, the transducers 101, 102, 103 may be virtual or visual sensors. The three transducers 101, 102, 103 work in concert to determine the position of the driver's head 34, and from this, the location of the eyes 32 of the driver 30.

Figure 2:
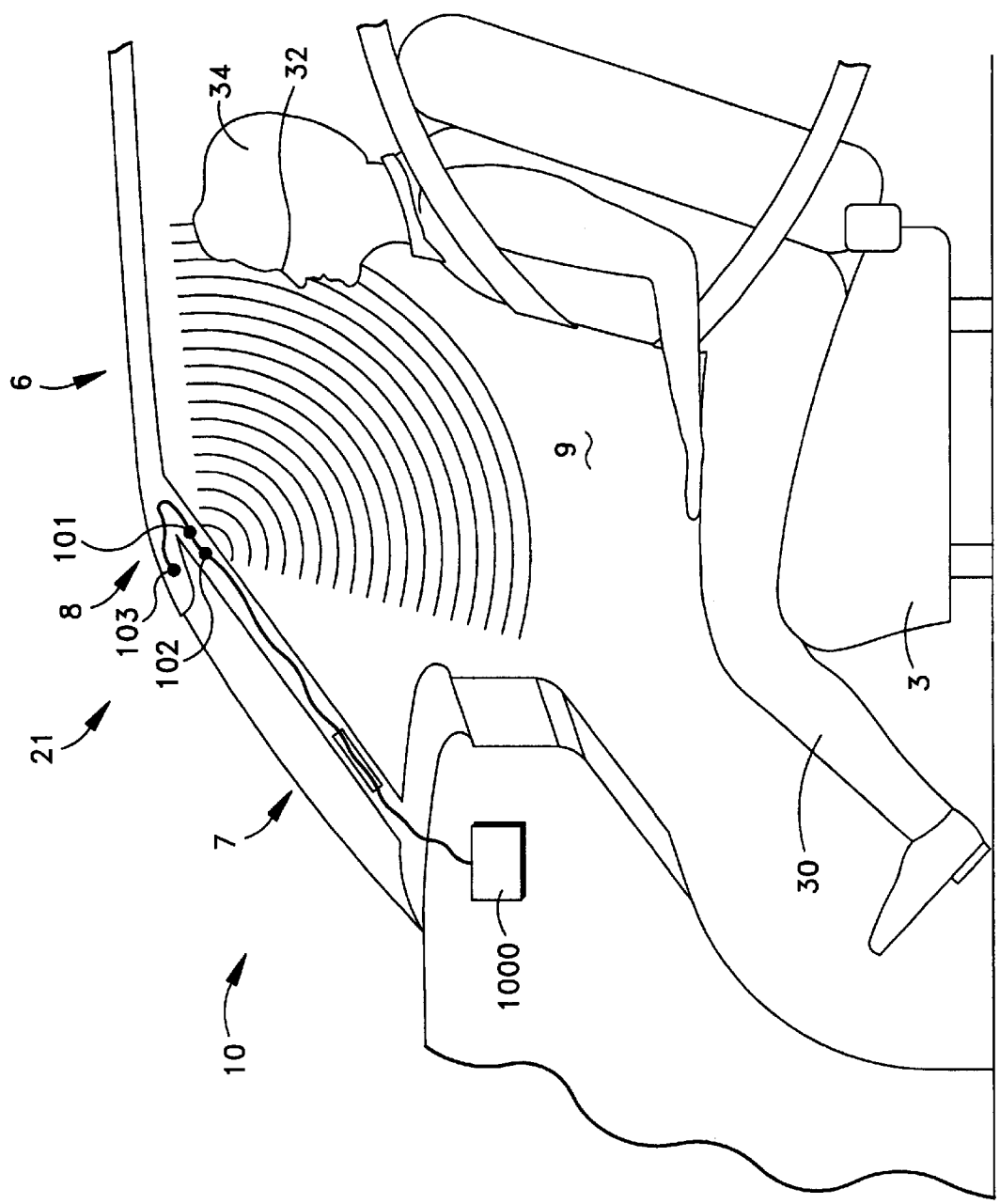
FIG. 2 is a schematic view of an interior of the vehicle of FIG. 1 illustrating part of the apparatus of FIG. 1.

As viewed in FIG. 2, the first and second transducers 101, 102 may be placed high in an A-pillar 7 of the vehicle 6 and the third transducer 103 positioned laterally offset from the first and second transducers in the headliner 8 of the vehicle. The first and second transducers 101, 102 provide information to permit the microcontroller 1000 to determine the vertical location of the head 34 of the driver 30. The third transducer 103 and either the first transducer 101 or the second transducer 102 provide information to permit the microcontroller 1000 to determine the horizontal location of the head 34 of the driver 30. The three transducers 101, 102, 103 are disposed high enough. in the passenger compartment 9 of the vehicle 6 so that the first ultrasonic reflection is from the head 34 of the driver 30. With alternative transducers, virtual or visual reflections would be from the head 34 of the driver 30.

As viewed in FIG. 5, the microcontroller 1000 may also include timer means 18. The timer means 18 determines the time that the first and second reflective surfaces 61; 62 remain in their respective temporary positions. As viewed in FIG. 1, the microcontroller 1000 typically is disposed under the dashboard of the vehicle 6.

The operation of the apparatus 10 will now be described. When the driver 30 initially sits in the driver's side seat 3 of the vehicle 6 and starts the ignition of the engine of the vehicle, the first locating means 21 senses the location of the driver's eyes 32 (as described above) and communicates the reflection (ultrasonic, virtual, or visual) data to the microcontroller 1000 via the first location signal 41. The microcontroller 1000 then determines the location of the eyes 32 of the driver 30. Alternatively, the eye location may be automatically determined without the starting of the ignition.

The first, third, and fifth utilizing means 51, 53, 55 of the microcontroller 1000 use the first location signal 41 to determine the proper default positions for the first, second, and third reflective surfaces 61, 62, 63. These default positions provide the most suitable views to the driver 30 during normal straight-ahead driving conditions. The microcontroller 1000 then communicates these positions to first, second, and third positioning mechanisms 81, 82, 83 associated with each respective reflective surface 61, 62, and 63. The positioning mechanisms 81, 82, 83 move the reflective surfaces 61, 62, 63 to the most suitable positions for normal forward driving of the vehicle 6 (i.e., regular zones of view) for the particular location of the eyes 32 of the driver 30.

The proper zones of view may be determined by empirical data stored in the microcontroller 1000 or calculations conducted within the microcontroller. The positioning mechanisms 81, 82, 83 may be electric motors or other suitable actuating devices. The driver 30 then begins normal operation of the vehicle 6 (i.e., placing the vehicle in gear, driving the vehicle, etc.) with the three reflective surfaces 61, 62, 63 in proper default positions for safe, straight ahead operation of the vehicle. The first and second driver alerts 91, 92 may continuously indicate to the driver 30 when external objects enter the blind spots of the first and second reflective surfaces 61, 62.

Figure 3:
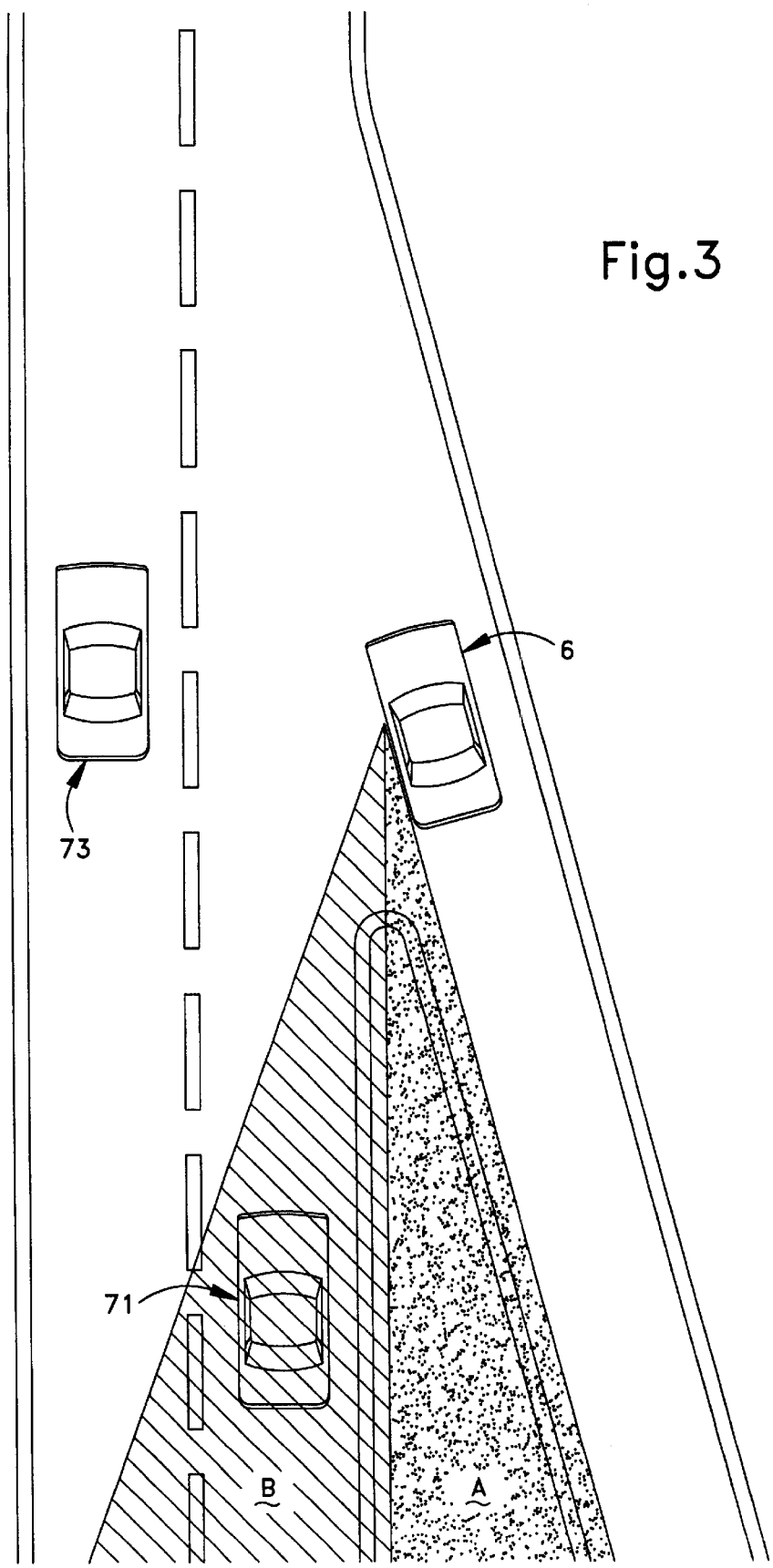
FIG. 3 is a plan view of a vehicle changing lanes to the left of the vehicle.

When the driver 30 of the vehicle 6 wishes to merge into traffic to the left of the vehicle 6, as viewed in FIG. 3, or change lanes to the left, it may be desirable to reposition the first reflective surface 61 to view the blind spot B of the first reflective surface instead of the regular zone A of view of the first reflective surface. The driver 30 of the vehicle 6 may initiate this repositioning by activating the left turn signal of the vehicle or by turning the steering wheel more than a predetermined amount to the left.

Once the repositioning is initiated, the microcontroller 1000 begins the movement cycle of the first reflective surface 61. The microcontroller 1000 causes the first positioning mechanism 81 to move the first reflective surface 61 in the outwards direction for a first time period of about one second during which the field of view of the first reflective surface on the left-hand side of the vehicle 6 moves from zone A to zone B, as viewed in FIG. 3. After the one second of movement, the first reflective surface 61 reaches the first temporary position and the driver 30 may view the first external object 71 in the blind spot B without turning his head 34. Other traffic represented by a third external object 73 remains in direct view of the driver 30. Thus the driver 30 of the vehicle 6 may make a safe judgment as to whether he should continue merging/changing lanes.

The first positioning mechanism 81 is inactive for a second time period of about one second while the first reflective surface 61 is positioned at the first temporary position. After the second time period, the first positioning means 81 moves the first reflective surface 61 in the inwards direction for a third time period of about one second. After the one second of inward movement, the first reflective surface 61 has returned to the first default position and the second utilizing means 52 cuts power to the first positioning means 81 until the next left merge/lane change.

Figure 4:
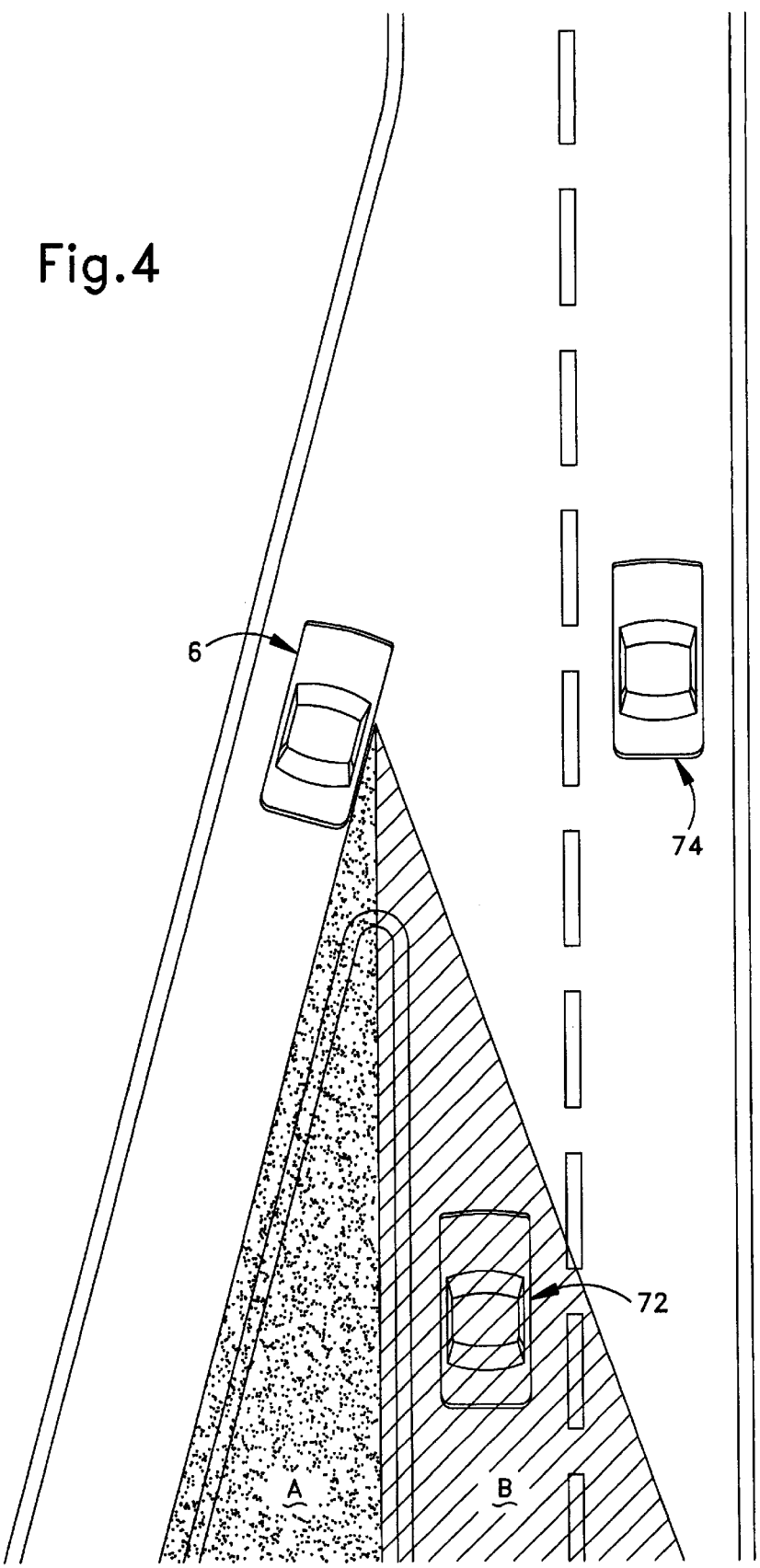
FIG. 4 is a plan view of a vehicle changing lanes to the right of the vehicle.

When the driver 30 of the vehicle 6 wishes to merge into traffic to the right of the vehicle 6, as viewed in FIG. 4, or change lanes to the right, it may be desirable to reposition the second reflective surface 62 to view the blind spot B of the second reflective surface instead of the regular zone A of view of the second reflective surface. The driver 30 of the vehicle 6 may initiate this repositioning by activating the right turn signal of the vehicle or by turning the steering wheel more than a predetermined amount to the right.

Once the repositioning is initiated, the microcontroller 1000 begins the movement cycle of the second reflective surface 62. The microcontroller 1000 causes the second positioning mechanism 82 to move the second reflective surface 62 in the outwards direction for a first time period of about one second during which the field of view of the second reflective surface on the right-hand side of the vehicle 6 moves from zone A to zone B, as viewed in FIG.

4. After the one second of movement, the second reflective surface 62 reaches the second temporary position and the driver 30 may view the second external object 72 in the blind spot B without turning his head 34. Other traffic represented by a fourth external object 74 remains indirect view of the driver 30. Thus the driver 30 of the vehicle 6 may make a safe judgment as to whether he should continue merging/changing lanes.

The second positioning mechanism 82 is inactive for a second time period of about one second while the second reflective surface 62 is positioned at the second temporary position. After the second time period, the second positioning means 82 moves the second reflective surface 62 in the inwards direction for a third time period of about one second. After the one second of inward movement, the second reflective surface 62 has returned to the second default position and the fourth utilizing means 54 cuts power to the second positioning means 82 until the next right merge/lane change.

Typically the temporary positioning of the reflective surfaces 61, 62 by the first and second positioning means 81, 82 occurs only about a vertical axis to change the field of view to different angles in the horizontal plane. It is of course possible to control more than one direction with the first and second positioning means 81, 82 to scan different fields of view as desired.

If the speed of movement of the first and second positioning means 81, 82 is not constant in any given direction or on any given side of the vehicle 6, the microcontroller 1000 may cause each motion of the first and second reflective surfaces 61, 62 to take place during any given required time period as determined by the timer means 18.

The second time period is the pause during which the first and second reflective surfaces 61, 62 remain in the first and second temporary positions. The second time period may be increased or decreased by the microcontroller 1000 as desired. It has been determined that for most electric side view mirrors, a period of about one second is sufficient to move a mirror from an initial position to the blind spot position and about one second to move it back.

To reduce the consumption of electrical power by positioning mechanisms 81, 82, 83 when not in use, it is preferable to interrupt power to the positioning mechanisms when any movement cycle is finished, such that power consumption and cooling problems of microcontroller 1000 and other circuitry are avoided. Power may be resumed for the next movement cycle.

From the above description of the invention, those skilled in the art will perceive improvements, changes and modifications. Such improvements, changes and modifications within the skill of the art are intended to be covered by the appended claims.

Having described the invention, the following is claimed:

1. A reflective surface positioning apparatus comprising:

first transponder means for transmitting and receiving occupant locating signals for locating part of an occupant of a vehicle and for producing a first location signal indicative of a location of the part of the vehicle occupant;

second transponder means for transmitting and receiving object locating signals for locating an object external to the vehicle and for producing a second location signal indicative of a location of the external object;

first means for utilizing the first location signal to cause positioning of a first reflective surface to a first default position; and second means for utilizing the second location signal to reposition the first reflective surface to a first temporary position for providing a view of the external object to the part of the vehicle occupant for a predetermined time interval and then returning the first reflective surface to the default position.

2. The apparatus as set forth in claim 1 further comprising:

third transmitter means for transmitting and receiving object locating signals for locating another object external to the vehicle and producing a third location signal indicative of a location of the other external object;

third means for utilizing the first location signal to cause positioning of a second reflective surface to a second default position; and fourth means for utilizing the third location signal to reposition the second reflective surface to a second temporary position for providing a view of the other external object to the part of the vehicle occupant for a predetermined time interval and then returning the second reflective surface to the second default position.

3. The apparatus as set forth in claim 2 wherein the part of the vehicle occupant is the occupant's eyes.

4. The apparatus as set forth in claim 3 further comprising:

fifth means for utilizing the first location signal to cause positioning of a third reflective surface to a third default position wherein the third reflective surface is a rear view mirror of the vehicle.

5. The apparatus as set forth in claim 1 wherein said first locating means includes three transducers disposed within a passenger compartment of the vehicle.

6. The apparatus as set forth in claim 1 further comprising a positioning mechanism for moving the first reflective surface from the first default position to the first temporary position.

7. The apparatus as set forth in claim 1 further comprising a driver alert device for communicating to the occupant of the vehicle that said apparatus has located an external object.

8. The apparatus as set forth in claim 1 wherein the second location signal indicates the presence of the external object in a predetermined area.

9. The apparatus as set forth in claim 1 wherein said first utilizing means and said second utilizing means are part of a controller disposed within a passenger compartment of the vehicle.

10. The apparatus as set forth in claim 1 wherein the first reflective surface is a driver's side view mirror, the first temporary position providing a view to the occupant of a blind spot of the driver's side view mirror.

11. A method for positioning at least one reflective surface on a vehicle, said method comprising the steps of:

transmitting and receiving occupant locating signals for locating a part of an occupant of the vehicle;

producing a first location signal indicative of a location of the part of the vehicle occupant;

transmitting and receiving object locating signals for locating an object external to the vehicle;

producing a second location signal indicative of a location of the external object;

utilizing the first location signal to cause positioning of a first reflective surface to a first default position;

utilizing the second location signal to reposition the first reflective surface to a first temporary position for providing a view of the external object to the part of the vehicle occupant for a predetermined time interval; and returning the first reflective surface to the default position.

12. The method as set forth in claim 11 further comprising the steps of:
- transmitting and receiving object locating signals for locating another object external to the vehicle;
- producing a third location signal indicative of a location of the other external object;
- utilizing the first location signal to cause positioning of a second reflective surface to a second default position;
- utilizing the third location signal to reposition the second reflective surface to a second temporary position for providing a view of the other external object to the part of the vehicle occupant for a predetermined time interval; and
- returning the second reflective surface to the second default position.

13. The method as set forth in claim 12 wherein the part of the vehicle occupant is the occupant's eyes.

14. The method as set forth in claim 12 wherein the third location signal indicates the presence of the other external object in a predetermined area.

15. The method as set forth in claim 11 further comprising the steps of:
- utilizing the first location signal to cause positioning of a third reflective surface to a third default position wherein the third reflective surface is a rear view mirror of the vehicle.

16. The method as set forth in claim 11 wherein the second location signal indicates the presence of the external object in a predetermined area.

17. The method as set forth in claim 11 wherein the step of locating an object external to the vehicle uses an ultrasonic sensor disposed at a rear corner of the vehicle.

18. The method as set forth in claim 11 wherein the first reflective surface remains in the first temporary position for about one second.

19. The method as set forth in claim 11 wherein the first reflective surface is a driver's side rear view mirror disposed on the vehicle.

20. The method as set forth in claim 11 further comprising the step of:
- activating the ignition of the vehicle in order to start said locating steps.

* * * * *